Patented July 13, 1926.

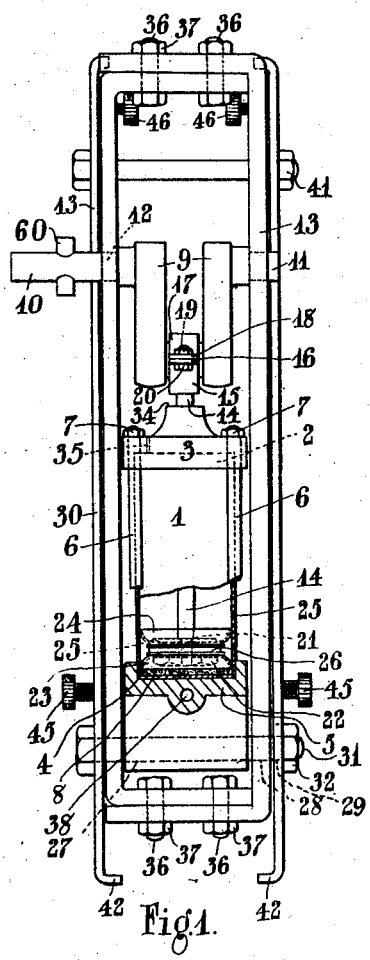
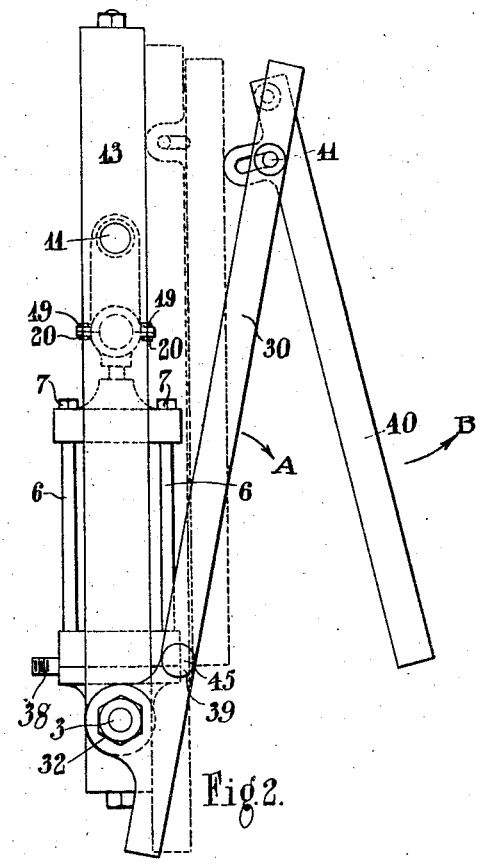
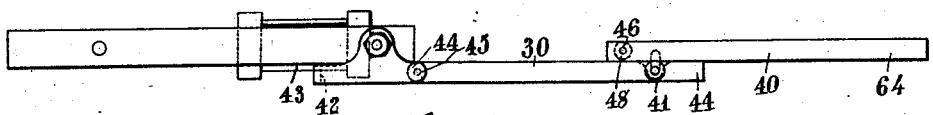
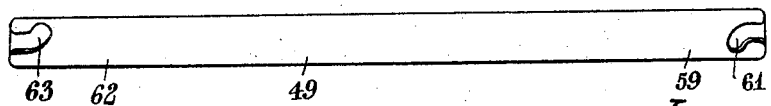

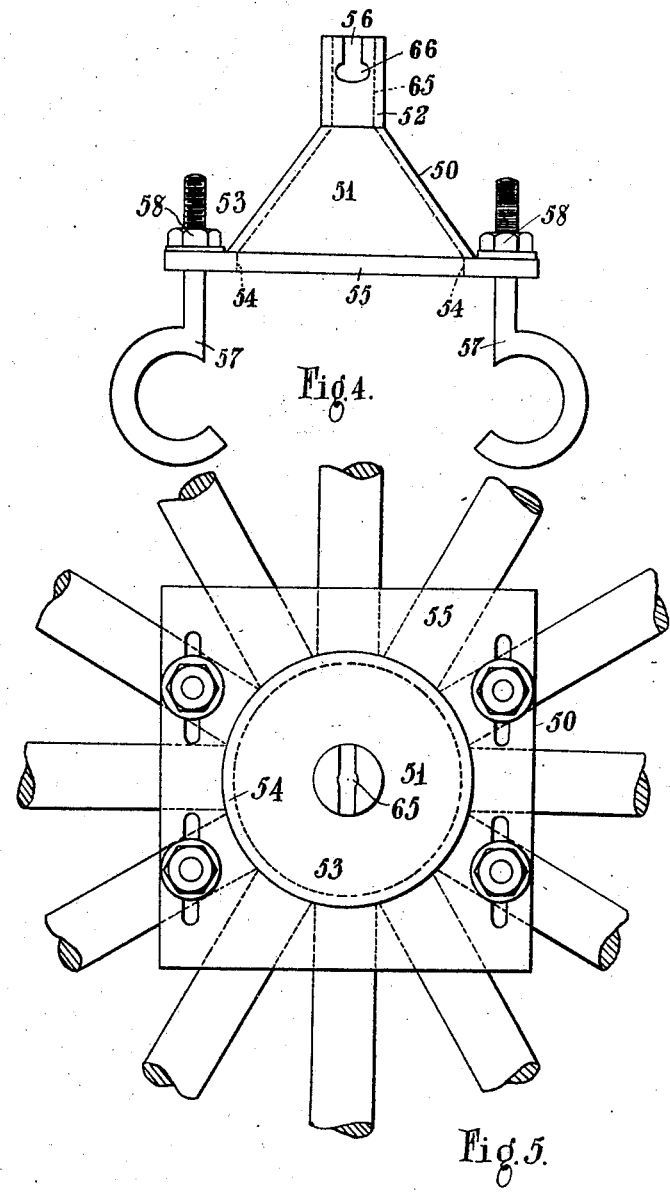

1,592,290

UNITED STATES PATENT OFFICE.

JOHN OSWALD YIP, OF PLN. ANNA REGINA, BRITISH GUIANA.

PNEUMATIC-TIRE PUMP.

Application filed December 11, 1922, Serial No. 606,218, and in Great Britain May 31, 1922. Renewed June 1, 1926.

This invention relates to pumps adapted to be detachably connected up with the power unit of a motor driven vehicle and with a pneumatic tire of the vehicle for the purpose of inflating said tire.

The object of the invention is to provide an improved form of pump which may be mechanically operated from an automobile engine shaft or the wheel with facility.

A further object of the invention is to provide a collapsible framework for a pump of the character described which is inexpensive to manufacture and may be readily and quickly extended and fitted into position when it is desired to inflate a tire.

Stated in general terms, my invention may be said to consist in a mechanically operated pneumatic tire pump comprising a portable self-contained unit which is readily attachable to and detachable from a vehicle and which comprises the combination of a rigid framework carrying the pump cylinder and provided with a crank shaft having bearings in the said framework, means whereby said crank shaft may be connected up with and driven from the motor and a collapsible framework pivotally connected to the said rigid framework and adapted, when in its operative and extended position, to engage the ground or an appropriate part of the vehicle in order to oppose the driving torque.

Referring now to the accompanying drawings which illustrate, by way of example, one convenient mode of carrying the invention into effect:—

Figure 1 is a fragmentary front elevation, partly in vertical section, of a pump constructed in accordance with this invention;

Figure 2 is a side elevation of same;

Figure 2ª is a side view on a smaller scale showing the extended position of the frame;

Figure 3 is a side elevation of a rod which may be employed for the purpose of connecting the pump to an automobile engine crank shaft, to be operated by power therefrom.

Figure 4 is a side elevation of an accessory which may be employed for the purpose of connecting the pump to the hub of an automobile rear wheel, to be operated by power therefrom.

Figure 5 is a plan of same showing the manner in which it is applied.

Referring to the drawings, one embodiment of this invention comprises a cylinder 1 having its ends fitted closely in circular recess 2 of cover 3 and recess 4 of cover 5. Covers 3 and 5 are held firmly on cylinder 1 by bolts 6 and nuts 7. Cover 5 is fitted airtight to cylinder 1 by airtight washer 8 which is pressed between said cover and cylinder by tightening bolts and nuts 7.

Crank 9 has its shafts 10 and 11 fitted in opposite holes 12 provided therefor on frame 13.

The upper end of rod 14 is screwed into the bottom part 15 of bearing 16, and the two parts 15 and 17 are clamped on to crank pin 18 by bolts 19 and nuts 20. The lower end of rod 14 being of a smaller diameter than the rest of said rod forms a shoulder 21 and is threaded to allow nut 22 to be screwed on to it.

The piston comprises a pair of oppositely disposed cup washers 23 and 24 which may be termed the inflating and intake packings respectively. These packings are fixed on to said lower end of rod 14 between washer 25 resting on shoulder 21, washer 26, and nut 22 which, being screwed on, presses the packings and washers against shoulder 21 and secures them in place.

Nut 22 is made as wide as possible so as to occupy the largest amount of vacant space around it, thereby allowing only the smallest amount of air to be retained within the cylinder when rod 14 is at the extremity of its inflating stroke.

A hole 27 is provided through cover 5 in a line with holes 28 on frame 13 and holes 29 on link 30. Holes 27, 28 and 29 have an equal diameter.

Bolt 31, a turning fit in holes 27, 28 and 29, keeps the bottom of the pump in frame 13, and keeps link 30 on frame 13 and is secured by nut 32.

Rod 14 passes through a hole provided therefor on cover 3, in a line with the centre of cylinder 1 and surrounded by a tapering projection 34 which gives additional bearing surface to said hole, thereby reducing the wear caused therein by rod 14 moving in it.

Oil-hole 35 is provided for the lubricating of the inside of cylinder 1 and pump packings.

Frame 13 is made up of two parts bolted together by bolts 36 and nuts 37.

Valves 38 and 39 are connected to the air chamber of cylinder 1 and may be either of the ball type or any other kind which opens when air is drawn or forced through them in one direction and closes and prevents air from passing in the opposite direction. Part of inflating valve 38 projects beyond the side of cover 5 and is threaded to allow an adaptor on a rubber tube to be screwed on to it and convey air therefrom to the tire to be inflated. When rod 14 is on its downward or inflating stroke, inflating valve 38 opens and air is forced through it into the tire, and intake valve 39 closes. When rod 14 is on its upward or intake stroke inflating valve 38 closes and intake valve 39 opens and all the air required for the cylinder is drawn through said intake valve.

When crank 9 rotates, rod 14 pushes the pump packing up and down in cylinder 1, thereby operating the pump. Crank 9 in rotating also causes the pump to move radially on bolt 31 within frame 13.

As air, if allowed to pass between the cylinder walls and packings, when being drawn into the cylinder, would draw away the lubricating oil therefrom and cause the pump packings to get dry, lose their efficiency, and cause the pump to overheat, intake packing 24 is provided to prevent it from passing between said cylinder walls and packings, thereby allowing the lubricating oil to be retained, whereby the pump may be operated efficiently at a very high speed without overheating.

Extension links 30 and 40 are provided to give additional length to frame 13, for a purpose to be explained hereinafter. The dotted lines in Figure 2 show the closed position of said extension links.

In lengthening out the frame, link 30 is turned on bolt 31 in the direction indicated by the arrow A in Figure 2 and link 40 is turned on bolt 41, by which it is hinged on to link 30, in the direction indicated by the arrow B in Figure 2.

When they assume the extended position indicated in Figure 2ª projecting lugs 42 jam frame 13 at the point 43 and link 30 is thereby prevented from turning further. In the said position link 40 jams against projecting lugs 42 of link 30 at the point 44 and is thereby prevented from turning further.

From the above it may be seen that the entire frame is rigid in the opening direction when it assumes the position indicated in Figure 2ª.

In order to make the entire frame rigid in the opposite or closing direction, when it assumes the extended position indicated in Figure 2ª, screws 45, provided on link 30, are screwed in and rest on the edge of frame 13 at the points 47 and prevent link 30 from turning in the closing direction, and screws 46 provided on link 40 are screwed in and rest on the edge of link 30 at the points 48 and prevent link 40 from turning in the closing direction.

It may be seen from the above that the entire frame can be made rigid in both directions when extended in the position indicated in Figure 2ª.

In closing the frame screws 45 and 46 are screwed backwards and the extension movements reversed.

Rod 49 Figure 3 is preferably hollow through its entire length to lighten its weight and is to be made a turning fit in the recess or opening into which a detachable starting handle is inserted when it is desired to start up the automobile engine. The said rod 49 is also provided at its ends with spiral recesses 61 and 63 the purpose of which will be described hereinafter.

Accessory 50 Figures 4 and 5 comprises a hollow conical shape 51 having a cylinder 52 on top, concentric to it and with its base 53 surrounding a circular recess 54 in plate 55. Cylinder 52 is provided with recesses 56. Parts 51, 52 and 55, are welded or otherwise made to form one piece. Hooks 57 are passed through slots formed in the plate 55 and nuts 58 are provided to secure the accessory firmly in place.

In applying the pump for use on an automobile engine crankshaft, pump crankshaft 10 is fitted into recess 61 on shaft 49 with pin 60 in the base of such recess. The adaptor on one end of a rubber tube is screwed on to inflating valve 38 and the adaptor on the other end is screwed on to the valve of the tire to be inflated. The automobile engine is started up and the detachable starting handle is withdrawn as soon as the engine is running. The end 62 of rod 49 is then pushed into the recess or opening from which the starting handle has been withdrawn until the starting handle pin slips into the spiral recess 63 and causes the crank 9 to be rotated by the rotating automobile crankshaft.

Recesses 61 and 63 are made spiral in the direction which will cause pin 60 and the starting handle pin, respectively, to be forced against their inner ends by the rotating automobile crankshaft, thereby keeping the pump on when working, without the aid of anyone.

The end 64 of the pump frame, rigidly lengthened out as indicated in Figure 2ª, rests on the ground in the direction in which it would resist the torque of the rotating crankshafts, which in operating the pump tend to turn it round bodily.

Instead of a spiral recess 63 being used at the end 62 of rod 49 any other recess or shape may be used which may be made to suit the end of the automobile crankshaft with which it is to engage.

In applying the pump to be operated by power from an automobile rear wheel, an accessory 50, Figures 4 and 5, may be applied with the conical shaped part 51 over the hub cap and the cylinder 52 concentric with the wheel hub. Hooks 57 are fitted on to corresponding spokes and nuts 58 are tightened to secure the accessory in place. Inflating valve 38 is connected by a rubber tube to the valve of the tire to be inflated. The wheel to which the accessory is fixed is jacked up. Crankshaft 10 is put into recess 56 with pin 60 in enlargement 66 which is provided to keep in the pin 60 when the pump is working. The frame is rigidly lengthened out as indicated in Figure 2$^a$ with end 64 resting on the ground in the direction in which it would oppose the driving torque. The engine is started and engaged in highest driving gear. The rotating automobile wheel rotates the crank 9 thereby operating the pump.

Although in the illustration an accessory 50 has been shown to be used in applying the pump to the rear wheel of an automobile, any other means may be used which can keep it firmly applied, with shaft 10 concentric with the wheel hub.

Although in the illustration a round shaft 10 and pin 60 are employed to fit the spiral recess 61, or the hole 56 and recess 66, any other suitable means may be employed to connect shaft 10 to any suitable rotary shaft of the vehicle besides the crankshaft or the rear wheel of such vehicle or automobile.

Although in the illustration this pump is shown as fitted with extension links 30 and 40 to lengthen the frame, it may be made without said links when required to be worked in a small space where the end of frame 13 can touch anywhere to oppose the torque.

Having now described my invention what I claim as new and desire to secure by Letters Patent is:—

1. A mechanically operated pneumatic tire pump comprising a portable self-contained unit which is readily attachable to and detachable from a vehicle and which comprises the combination of a rigid framework carrying the pump cylinder and provided with a crank shaft having bearings in said framework, means whereby said crank shaft may be connected up with and driven from the motor, a pair of parallel bars pivotally connected to said rigid framework and means for holding said bars rigid in their extended and operative position.

2. A mechanically operated pneumatic tire pump comprising a portable self-contained unit which is readily attachable to and detachable from a vehicle and which comprises the combination of a rigid framework carrying the pump cylinder and provided with a crank shaft having bearings in said framework, means whereby said crank shaft may be connected up with and driven from the motor, a pair of parallel bars pivotally connected to said rigid framework, means for holding and fixing said bars in their extended and operative position, a second pair of bars pivotally connected to the first mentioned pair and means for holding and fixing said second pair of bars rigid in their extended position.

3. A mechanically operated pneumatic tire pump comprising a portable self-contained unit which is readily attachable to and detachable from a vehicle and which comprises the combination of a rigid framework, a pivot pin mounted in said framework, a cylinder mounted on said pivot pin, a crankshaft having bearings in said framework, means whereby said crank shaft may be connected up with and driven from the motor, a pair of parallel bars mounted on said pivot pin outside said framework, thumb screws on said bars for holding same rigid with the framework when in their extended position, a second pair of bars pivoted to the first mentioned pair and thumb screws for holding said second pair of bars rigid with the first mentioned pair when extended for the purpose set forth.

4. A mechanically operated pneumatic tire pump comprising a framework, a pivot pin mounted in said framework, a cylinder mounted on said pivot pin, a crankshaft having bearings in said framework, a piston operating in said cylinder and connected to said crank shaft, said piston comprising a pair of oppositely disposed cup-shaped washers, means for connecting the crankshaft to a prime mover, a pair of parallel bars mounted on said pivot pin outside said framework, thumb screws on said bars for holding the bars rigidly in alignment with said framework, a second pair of bars pivoted to the first mentioned pair and thumb screws for holding said pair of bars rigidly with one another in their extended relation for the purpose set forth.

5. A mechanically operated pneumatic tire pump comprising a portable self-contained unit which is readily attachable to and detachable from a vehicle and which comprises the combination of a rigid framework made up of a pair of plates having inturned ends and bolts securing the inturned ends together, a pump cylinder carried by said framework, a crank shaft having bearings in said framework, means whereby said crank shaft may be connected up with and driven from the motor and a collapsible framework pivotally connected to said rigid framework and adapted, when in its operative and extended position, to engage the ground in order to oppose the driving torque.

6. A mechanically operated pneumatic tire pump as claimed in claim 2 wherein the said pair of parallel bars are provided with projecting lugs for arresting the pivotal movement of the bars when they reach their extended position.

In testimony whereof I have signed my name to this specification.

JOHN OSWALD YIP.